March 30, 1954

G. A. FOISY 2,673,644

PRESS FOR EXTRUDING TUBULAR ARTICLES AND
AUTOMATIC FEED MECHANISM THEREFOR

Filed Oct. 23, 1950

INVENTOR.
GEORGE A. FOISY
BY
Harold F. Wilhelm
ATTORNEY.

March 30, 1954    G. A. FOISY    2,673,644
PRESS FOR EXTRUDING TUBULAR ARTICLES AND
AUTOMATIC FEED MECHANISM THEREFOR
Filed Oct. 23, 1950    8 Sheets-Sheet 4
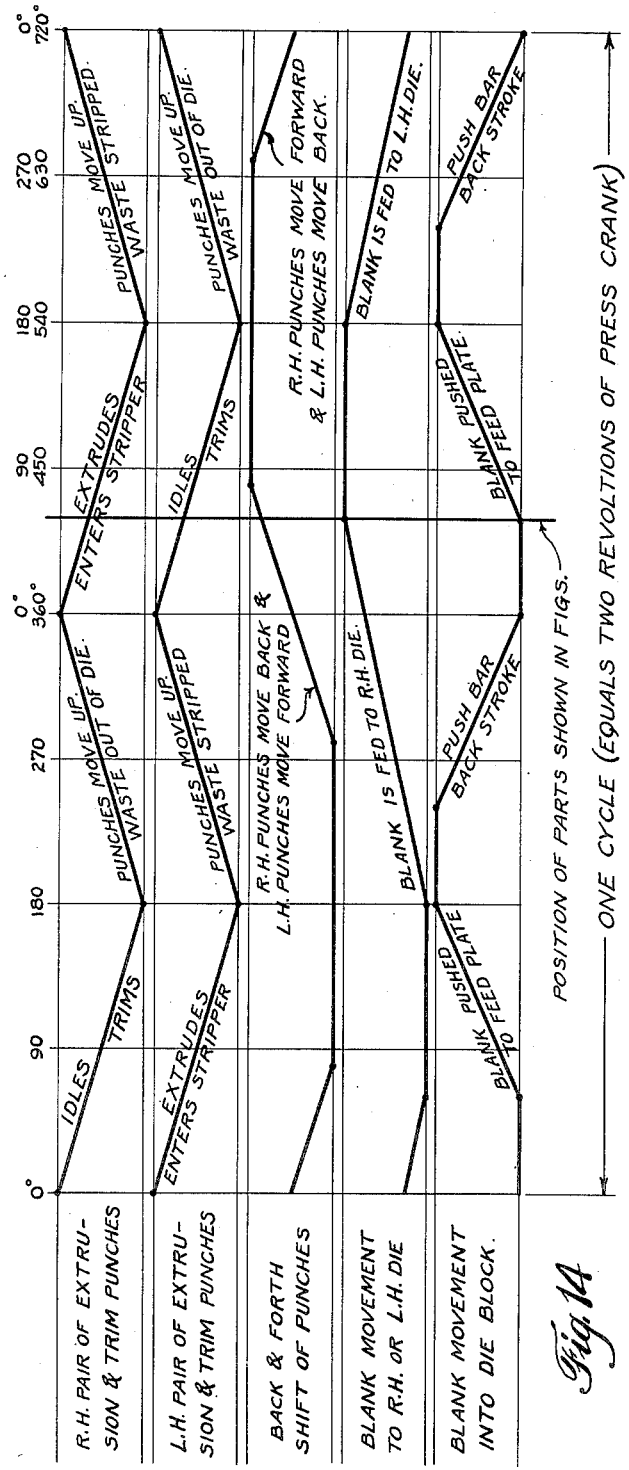
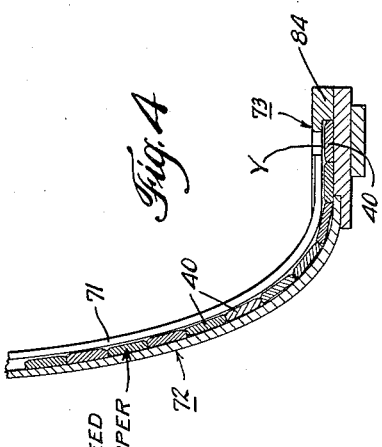
INVENTOR.
GEORGE A. FOISY
BY
Harold F. Wilhelm
ATTORNEY.

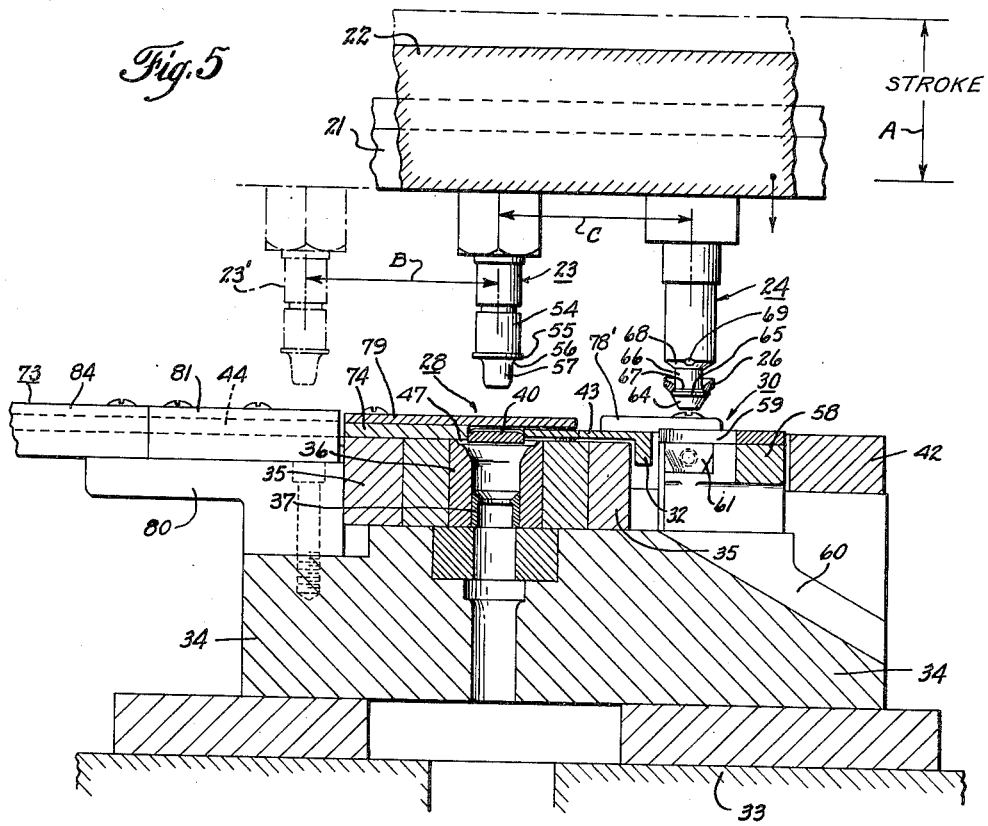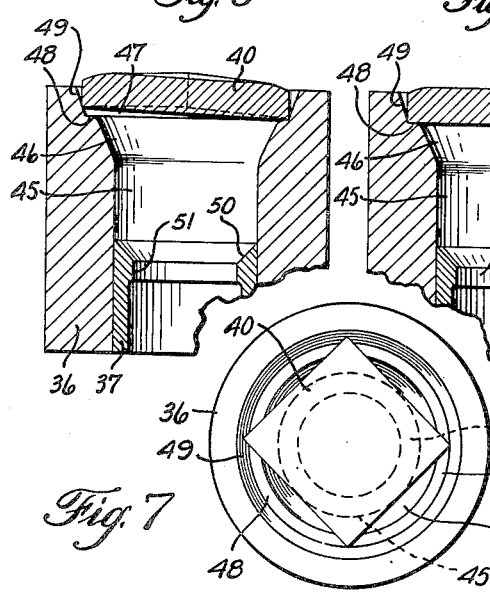
INVENTOR.
GEORGE A. FOISY
BY
Harold F. Wilhelm
ATTORNEY.

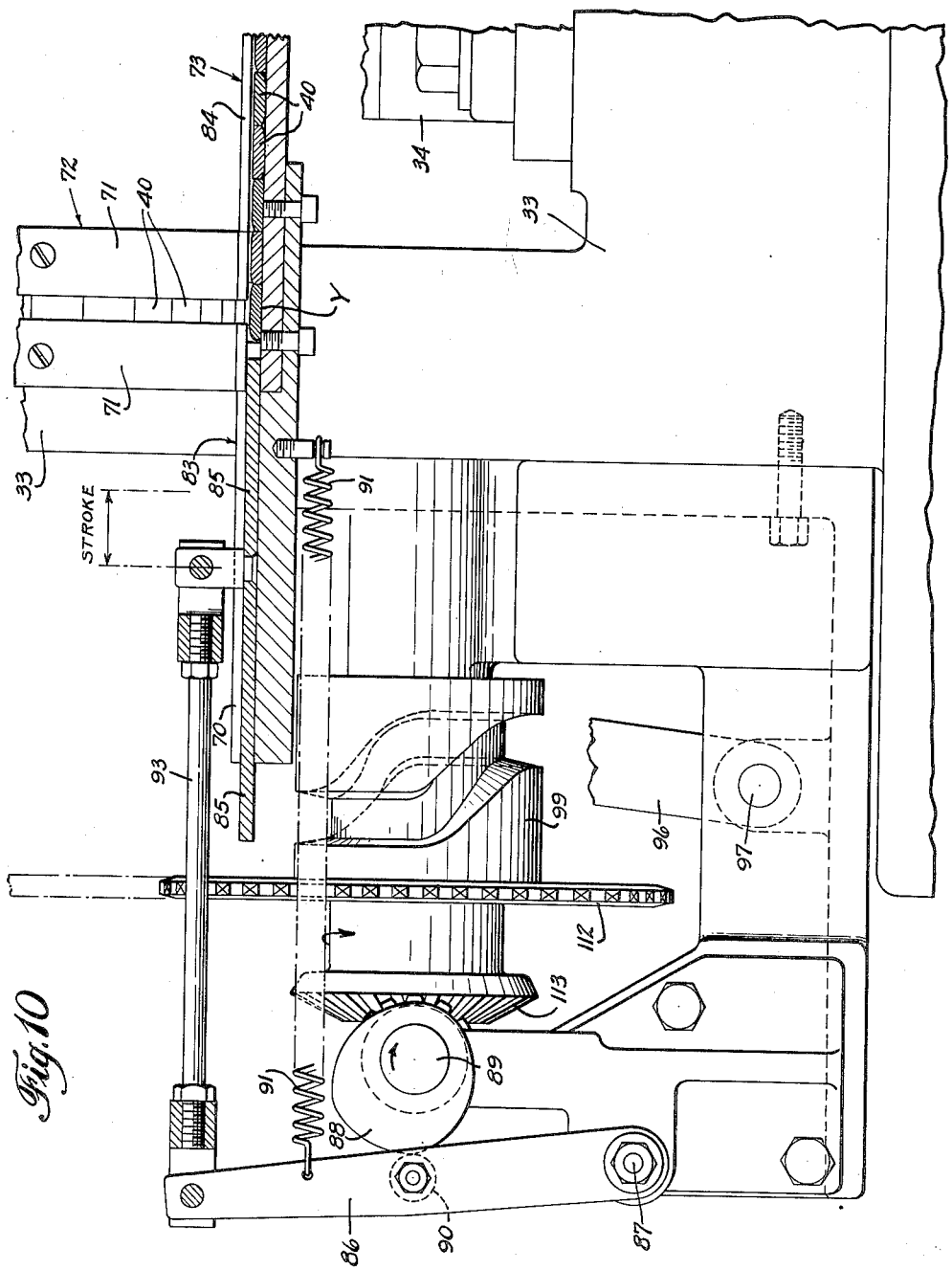

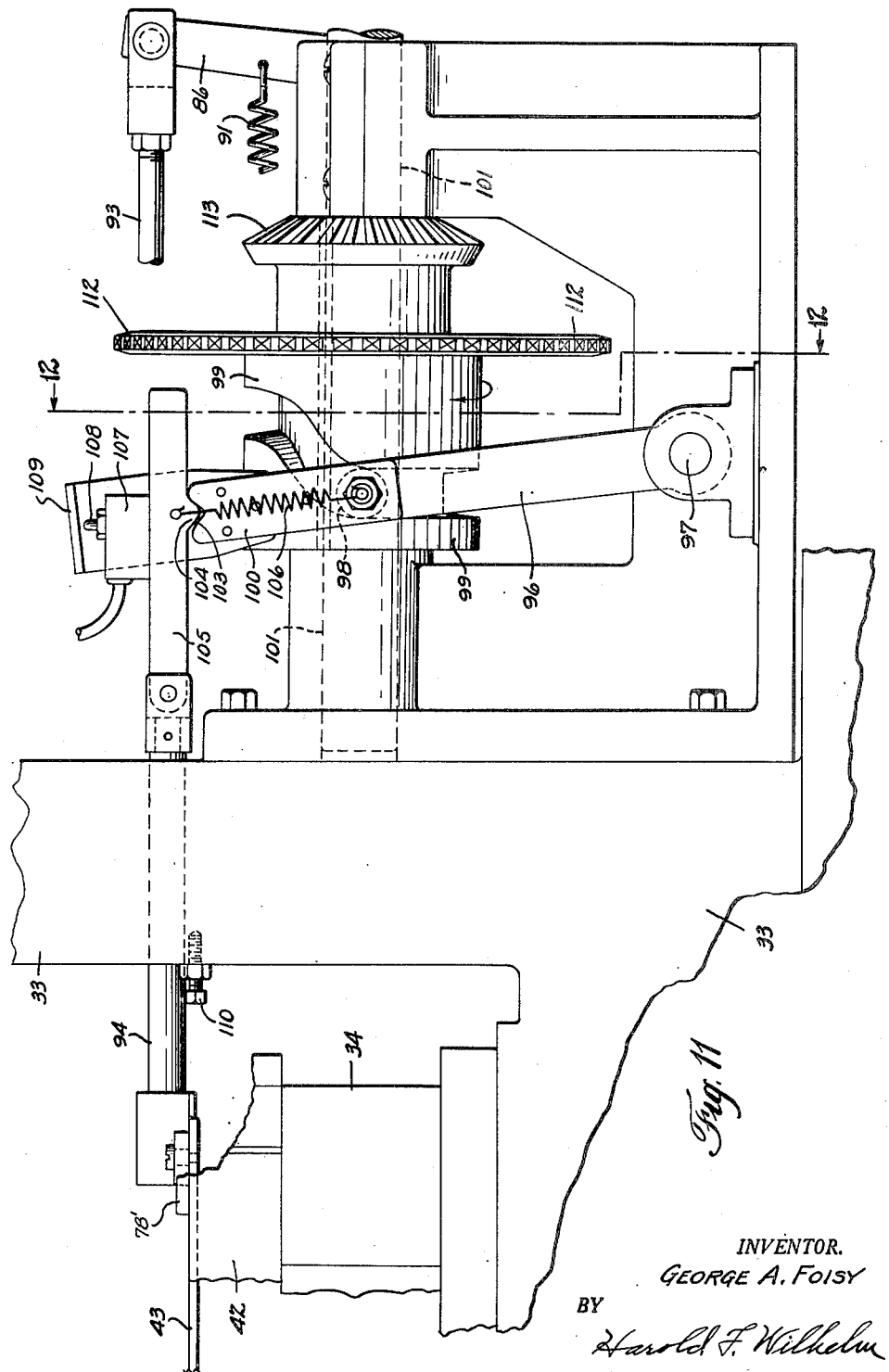

March 30, 1954
G. A. FOISY
2,673,644
PRESS FOR EXTRUDING TUBULAR ARTICLES AND
AUTOMATIC FEED MECHANISM THEREFOR
Filed Oct. 23, 1950
8 Sheets-Sheet 8
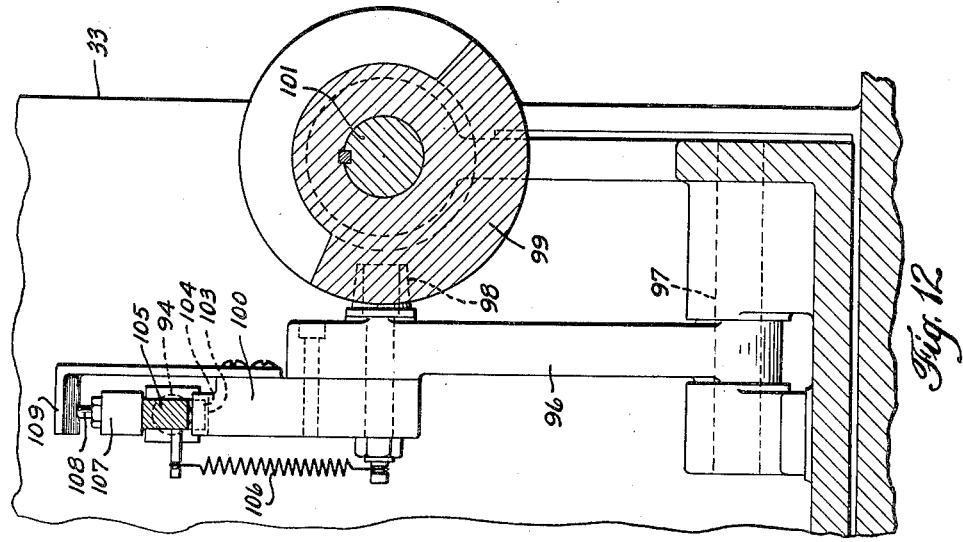
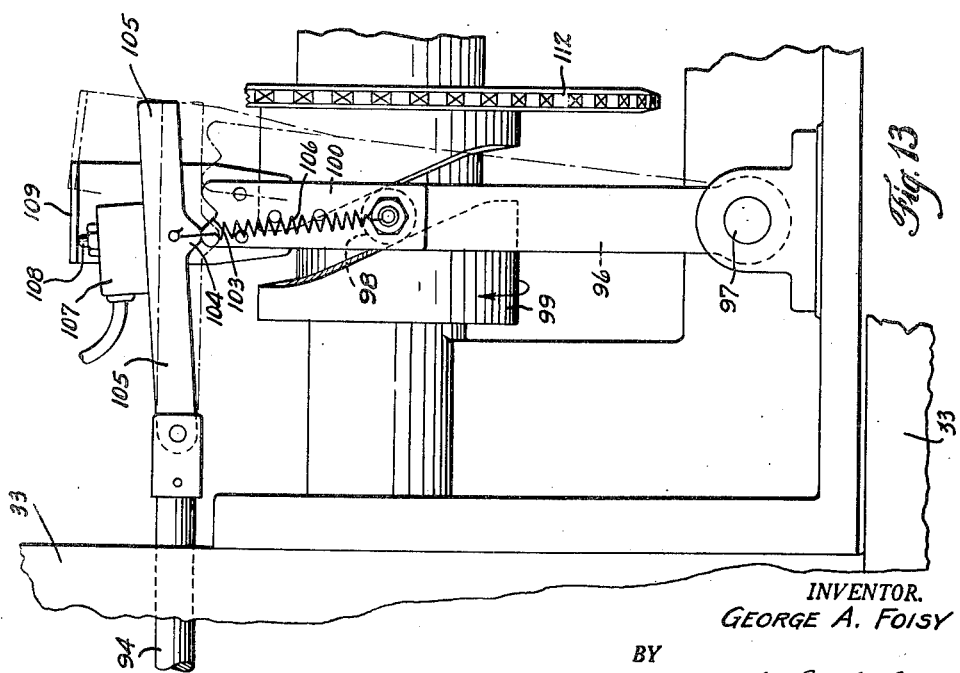
INVENTOR.
GEORGE A. FOISY
BY
Harold F. Wilhelm
ATTORNEY.

Patented Mar. 30, 1954

2,673,644

UNITED STATES PATENT OFFICE 2,673,644

PRESS FOR EXTRUDING TUBULAR ARTICLES AND AUTOMATIC FEED MECHANISM THEREFOR

George A. Foisy, New Haven, Conn., assignor to Olin Industries, Inc., New Haven, Conn., a corporation of Delaware Application October 23, 1950, Serial No. 191,622

11 Claims. (Cl. 207—6)

The invention relates to the extrusion of tubular articles, such as used in the manufacture of cartridge shells, and more particularly to a novel form of press whereby the blanks are fed automatically and accurately to the extrusion apparatus.

The present invention is particularly useful with extruding methods and apparatus such as disclosed in application, Serial No. 774,913, filed September 19, 1947, in the name of Emile Blair, now Patent No. 2,630,916, and in application, Serial No. 188,049, filed October 2, 1950, in the name of Herbert C. Childs, although not limited to such use.

The Blair application relates to the cupping and extrusion of a tubular article from a polygonal disc blank, in a single pass of the press. After the blank is extruded, it is necessary to sever the scrap ring from the tubular end product of the machine. The scrap ring is removed from the extrusion die by a separate trimming punch, on its upward stroke; the scrap ring is stripped from the trimming punch by passing the latter down into, and up out of, suitable stripping apparatus. The Childs application provides a unique trimming punch having a special swaging surface which squeezes the scrap ring as it severs it from the tubular product, thus providing more positive interlock between scrap ring and punch.

Important objects of the present invention are to improve the performance of extrusion presses of the type disclosed in the above-mentioned prior applications; to provide an automatic feed device which will accurately feed polygonal disc blanks to the extrusion dies; to provide a centering nest arrangement for properly centering square disc blanks in the extrusion dies, regardless of tolerance variations in size of the blanks; and in general, to provide a novel form of duplex press having right hand and left hand extrusion dies and right hand and left hand stripping apparatus.

According to a preferred form of the invention, the press comprises a stationary bed or frame having right hand and left hand extrusion dies and right hand and left hand stripping assemblies directly in back of their respective extrusion dies. The press comprises a vertically reciprocable ram carrying a right hand and a left hand horizontal reciprocable cross head which reciprocate from front to back of the press. Each cross head carries an extruding punch and trimming punch. Extending across the die bed is a selector cross slide having a lug with a blank-receiving recess on either side. The die bed is provided with a pathway for feeding blanks to the cross slide so that the latter can alternately deliver a blank to right hand and left hand extrusion dies. The blanks are fed from a suitable hopper into a gravity chute having a horizontal portion which intersects a horizontal feed guide. A feed pusher is provided, which oscillates back and forth, to push a line of blanks, one by one, to the selector cross slide. Suitable safety devices are provided in the drive for the selector cross slide to stop the machine in case something jams. A special centering nest is provided for each extrusion die to properly center the blanks, regardless of difference in size due to tolerance variations.

The invention also consists in certain new and original features and combinations hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which:

Fig. 4 is a fragmentary vertical section, taken on the line 4—4 of Fig. 1, and showing the gravity chute for carrying a line of blanks from a hopper (not shown) to a guideway wherein a line of blanks is formed and moved toward the extrusion dies;

Fig. 5 is a vertical section taken on the line 5—5 of Fig. 3. The extent to which the extrusion punch and trim punch shift position on alternate press strokes is indicated by dot-and-dash lines;

Fig. 6 is a vertical section through an extrusion die, showing a blank in the centering nest, as viewed on a plane passing diagonally through the square blank. The blank shown is a "large" blank, i. e. one near the upper tolerance limit; the view illustrates the centering action by the tapered wall of the centering nest of the die:

Fig. 7 is a plan view of Fig. 6;

Fig. 8 is a view similar to Fig. 6, but shows a blank whose size is near the lower tolerance limit;

Fig. 9 is a view similar to Fig. 6, but shows a "large" blank with its "upper," or slightly convex surface, faced downwardly, i. e. inverted with respect to the blank shown in Fig. 6;

Fig. 10 is a fragmentary vertical section, taken on the line 10—10 of Fig. 1, and showing the cam controlled feed pusher whereby a line of blanks is fed toward the die, one at a time, in timed relation with press strokes;

Fig. 11 is a fragmentary vertical elevation, as viewed from the line 11—11 of Fig. 1, showing the safety device for driving the selector cross slide for alternately feeding a blank to either of the two extrusion dies. This safety device comes into play, in case something jams, to stop the press;

Fig. 12 is a vertical section, taken along the line 12—12 of Fig. 11;

Fig. 13 is a view similar to Fig. 11 showing the operation of the safety devices, caused by a jam; and Fig. 14 is a time chart illustrating a complete operation cycle of the machine.

Figure 1:
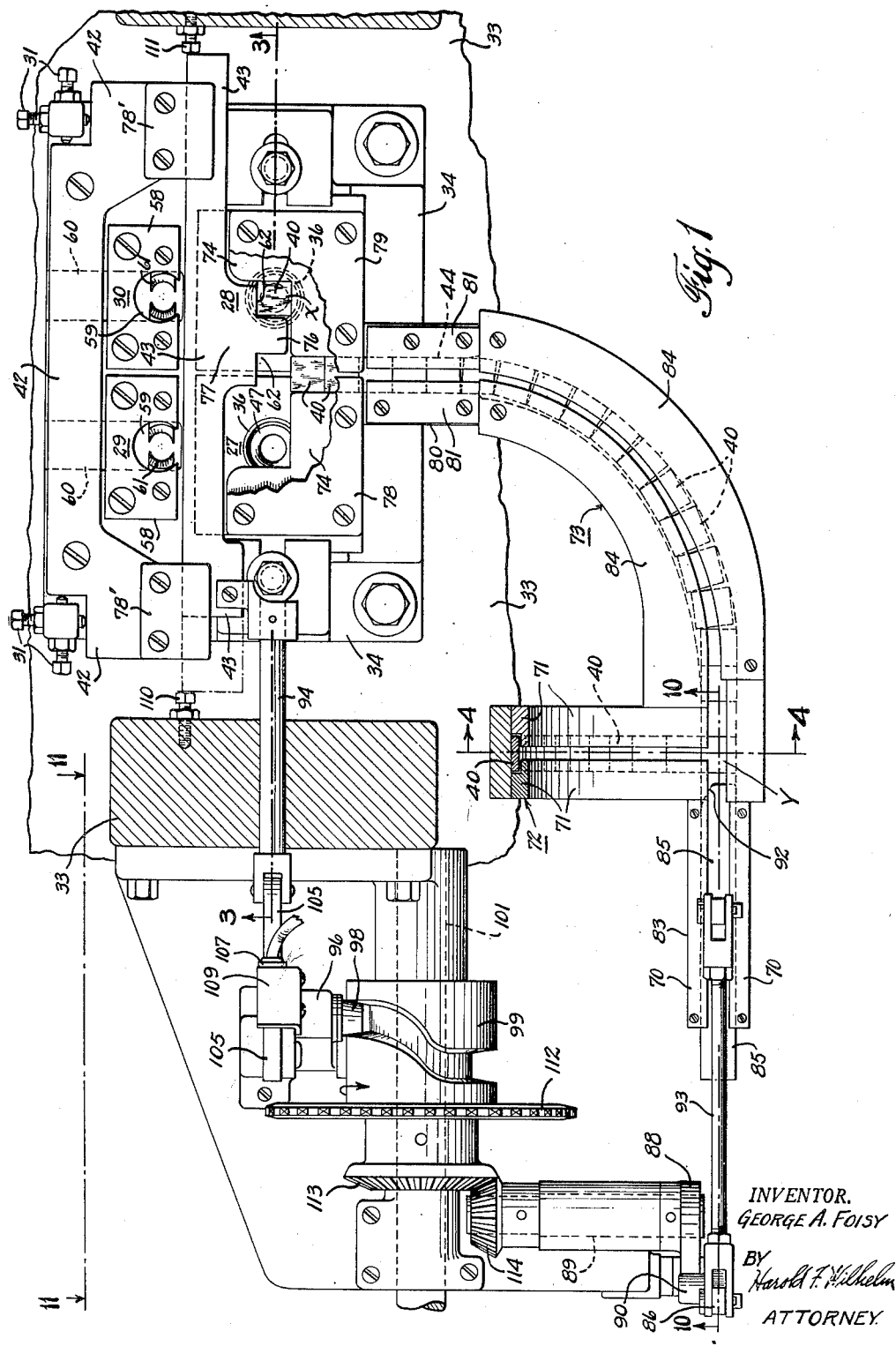
Fig. 1 is a fragmentary plan section of a punch press, taken just above the die block assembly, illustrating the means for feeding the blanks to the die block and positioning them alternately in either one of two extrusion die positions.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, and more particularly to Figs. 1, 2, 3 and 5, the extrusion press will be first generally described.

The press comprises a stationary frame 33 (Fig. 3) on which rests a base block 34 (Fig. 2) carrying a left hand extrusion die or station 27 and left hand stripping apparatus or station 29; and also carrying right hand extrusion die or station 28 and right hand stripping apparatus or station 30.

Figure 3:
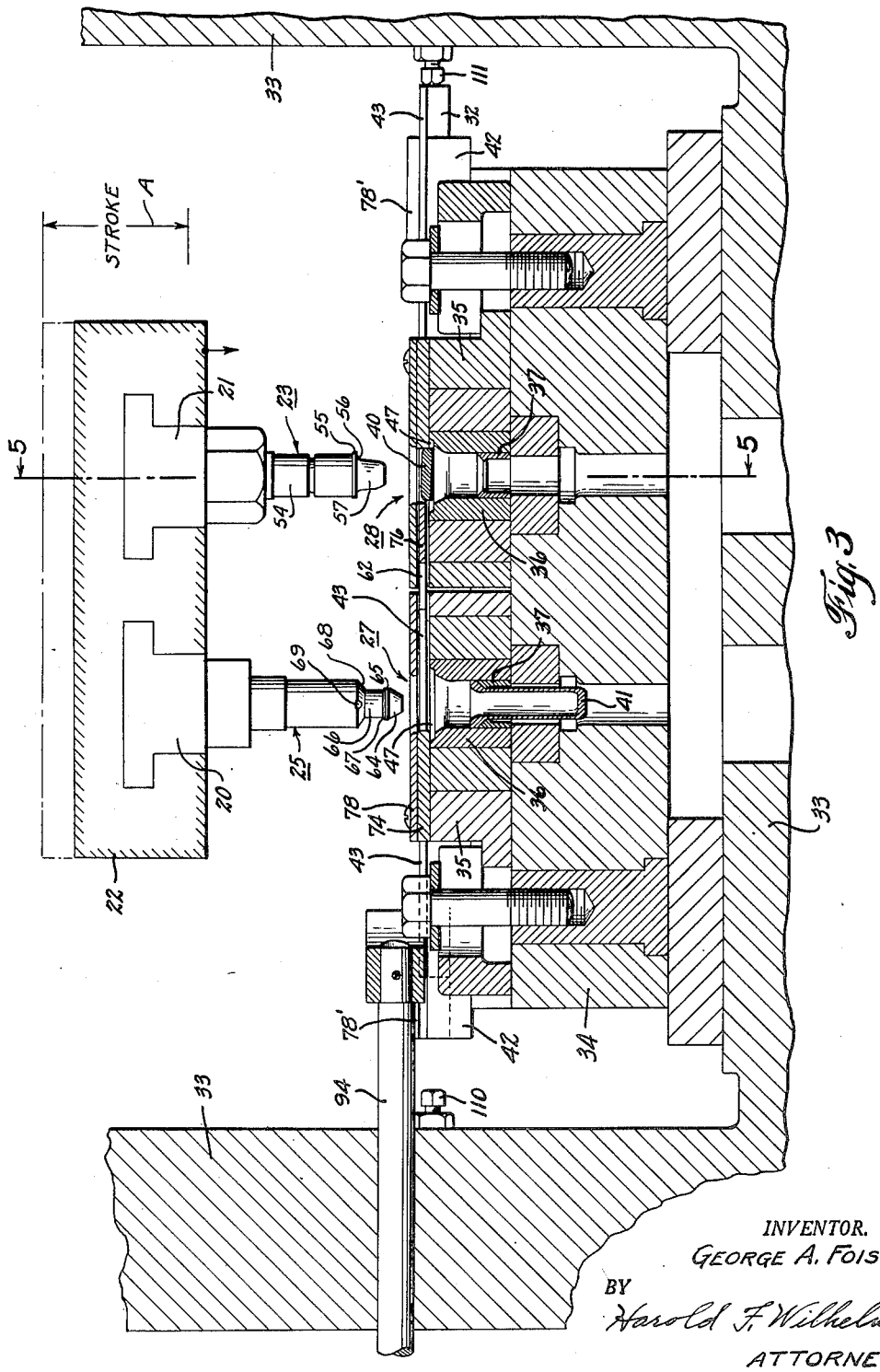
Fig. 3 is a vertical section taken on the line 3—3 of Fig. 1. This view shows the left hand extrusion die containing a shell extruded on the previous stroke of the press and ready to be trimmed on the next stroke, while the right hand extrusion die contains a blank in its centering nest, ready to be cupped and extruded on the next press stroke.

The extrusion press also comprises a vertically reciprocable ram 22 (Fig. 3) in which is slidably mounted a left hand, horizontally reciprocable cross head 20 and a right hand horizontally reciprocable cross head 21. The right hand cross head 21 (Fig. 5) carries extrusion punch 23 and trimming punch 24. The left hand cross head 20 carries an extrusion punch (not shown) and a trimming punch 25 (Fig. 3).

The cycle of movement of the ram 22 and cross heads 20, 21 is shown in the diagram in Fig. 14 and will be described more in detail below. The construction of the ram 22 and of the cross heads 20, 21, and of the driving devices therefor is shown somewhat diagrammatically and incomplete for purposes of simplicity; the devices for driving the ram and cross heads forms no part of the present invention, except in combination with the particular details of construction described below. Means for operating the ram and for operating the cross heads are well known.

It will be understood that the ram 22 reciprocates vertically in suitable vertical guides (not shown) partaking of a stroke indicated by the arrow A in Fig. 5. The cross heads 20 and 21 reciprocate horizontally, as indicated by the arrows B and C in Fig. 5. In this figure the extrusion punch 23 is ready to descend into the extrusion die 28 to cup square blank 40 and extrude it to form tubular product 41 (Fig. 3). At the same time, the trimming punch 24, which has picked up a scrap ring 26 from a previous trimming operation, is ready to descend into the stripping apparatus 30 so as to strip off the scrap ring 26; the scrap ring thereupon falls into the chute 60 which delivers it from the machine.

On the next upstroke of the ram 22, the right hand cross head 21 shifts to the left, as indicated by the arrows B and C in Fig. 5; this brings the trimming punch 24 in line with the extrusion die 28 and the extrusion punch 23 over an idling space in front of the die, as indicated by 23' in Fig. 5. When the ram 22 descends again, the trimming punch 24 trims the extruded product in the extrusion die 28; on its upward stroke it picks up the scrap ring 26, whereupon the cross head 21 shifts back to the position shown in full lines in Fig. 5 ready for the next cycle.

It will be understood that, while right hand cross head 21 is executing the up-and-down cycle described above, the left hand cross head 20 is executing a similar but complementary up-and-down cycle. That is to say, while right hand extrusion punch 23 is entering die 28, left hand trimming punch 25 is entering extrusion die 27 (Fig. 3) and the left hand extrusion punch (not shown) is descending in an idling space in front of the die block.

Thus each extrusion punch alternately enters its extrusion die and then idles by entering its idling space in front of the die block, and each trim punch alternately enters its extrusion die and its stripping apparatus.

The blank feeding system comprises, in general, a feed slot 44 (Fig. 2) which delivers a line of square blanks to the selector cross slide 43. This latter has a lug 76 forming an angular blank-receiving recess 62 on each side to receive a blank 40. It will be noted from Figure 2 that the left hand recess 62 is ready to receive a blank and that the right hand recess 62 has delivered a blank (see position X) over the right hand extrusion die 28.

The blanks are fed to the feed slot 44 from a hopper (not shown) into a vertical gravity chute 72 (Fig. 1) which intersects with a curved horizontal feed guide 73. A pusher rod 85 oscillates back and forth to push the line of blanks 40, one by one, along curved horizontal guide 73 to deliver the blanks, one by one, to the selector cross slide 43.

The parts of the press will now be described more in detail.

As indicated particularly in Figs. 1, 2, 3 and 5, the stationary frame 33 carries a base block 34 which in turn carries die blocks 35. The die blocks carry the extrusion rings 36 and extrusion bushings 37 of the extrusion dies 27 and 28. Reinforcing members 38 and 39 hold the extrusion rings 36 and extrusion bushings 37 in position. The base block 34 also supports stripping assemblies 29 and 30 held in place by screws (Fig. 1).

It will be understood that the particular manner of holding the stationary die parts and stripping assemblies on the base or frame of the machine form no part of the present invention as these means are well known.

The construction of the extrusion die and stripping apparatus, and of the extrusion punch and trimming punch, is disclosed in the above mentioned Childs application. Certain features relating to the extrusion die and extrusion punch are described and claimed in the above-mentioned Blair application, and certain features relating to the trimming punch are described and claimed in the Childs application.

Referring more particularly to Figs. 3 and 5 to 9, the extrusion dies 27 and 28 will now be briefly described. Since the two dies are alike, it is only necessary to describe one.

The extrusion die comprises an extrusion ring 36 housing an extrusion bushing 37. The ring 36 has a cylindrical bore 45 merging into a flaring mouth 46. At the top of the flaring mouth is a centering nest 47 comprising an annular seat or shoulder 48 with an annular tapered side wall 49. The extrusion bushing 37 has a beveled squeeze surface 50 and an extrusion flange 51.

The extrusion punch will now be briefly described. Since the two are alike, it is only necessary to describe one.

The extrusion punch 23 (Figs. 3 and 5) comprises a shank 54 having a centering flange 55 which fits into the circular bore 45 of the extrusion die. It supports a squeeze surface 56 cooperating with squeeze surface 50 of the die and has a former or plug 57.

It will be understood that as the extrusion plunger 23 enters extrusion die 28, it first cups square blank 40 and then extrudes it into a tubular product, indicated by 41 in Fig. 3.

The trimming punches 24 and 25 are alike, and therefore, it is only necessary to describe one in detail. As shown in Figs. 3 and 5, it comprises a conical nose 64 having a shear flange 65; it has a shank recess 66 providing a slight bevel 67. It also has a swaging surface 68 provided with a plurality of overflow notches 69.

As the trimming punch 25 enters the extrusion die 27 (see Fig. 3), the shear flange 65 cooperates with the flange 51 on the die to shear off the scrap ring 26, and the swaging surface 68 squeezes the scrap ring down against the squeeze surface 50 of the die, causing the metal of the scrap ring 26 to flow over against the reduced shank 66. Any excess metal in the scrap ring flows into the overflow notches 69. This provides a more positive interlock between the scrap ring and the trimming punch 25 so that, as the trimming punch rises, it positively carries the scrap ring with it without danger of the scrap ring falling off the trimming punch prematurely. See scrap ring 26 on trimming punch 24 in Fig. 5.

The stripping devices 29 and 30 are alike, so it is only necessary to describe one. Each stripping device (Figs. 1, 2 and 5) comprises a block 58 having an opening 59 connecting with chute 60. Mounted within opening 59 is a pair of spring pressed jaws 61. As trimming punch 24, carrying scrap ring 26 (see Fig. 5), descends into the stripping apparatus, the spring pressed jaws 61 spring into the space between scrap ring 26 and swaging shoulder 68; upward movement of the trimming punch strips the scrap ring 26 from the trimming punch, whereupon the scrap ring falls into the chute 60 where it is delivered from the machine.

The coaction of the centering nest 47 with the square blanks 40 will now be described.

Referring now to Figs. 2 and 6 to 9, the centering nest 47 is for the purpose of insuring the centering of a square (or other polygonal) disc blank 40 in the circular seat so that the extruded product will be symmetrical regardless of variations in the size of the blank due to tolerance or of the face presentation of the blank in the nest. Compare Figs. 6, 8 and 9, for example.

It will be understood that, due to tolerance variations and other causes, all of the blanks may not be exactly the same size or shape. The blanks may vary, for example, from a minimum size in which all four corners may seat snugly in the centering nest against the seat 48, as shown in Fig. 8, to a size in which the blank 40 may have certain corners at the seat 48 of the centering nest and other corners part way up the tapered side wall 49, as shown, for example, in Fig. 6.

Furthermore, while provision is made for feeding the blanks in a predetermined position of orientation so that a flat edge thereof is always disposed in a line perpendicular to the line of travel, no provision is made for keeping the blanks with the same face presentation downward.

It will be noted particularly from Figs. 6 to 9 that the blank 40 is not completely symmetrical with respect to its top and bottom faces. Due to the punching or stamping operation which manufactures the blanks from sheet metal stock, the corners of the upper face (as shown in Fig. 8) may be swaged or drawn more than the corresponding corners of the lower face. For convenience, the blank shown in Fig. 6 will be said to have an upright presentation, while the blank shown in Fig. 9 will be said to have an inverted presentation.

It will be noted from Figs. 6 and 7 that the seat 48 of the centering nest is narrow as compared to the size of the blank; and that only the portions adjacent the corners of the square blank rest on, or above, the seat 48; and that the midpoints of the straight edges of the blank are located directly over the flare 46 of the die mouth. As pointed out in the Blair application, the use of a polygonal blank has certain important advantages in the extrusion operation, permitting cupping of the blank, and extruding it into a tubular product, in a single pass of the press.

The centering action of the centering nest 47 will now be described. It will be noted from Fig. 8 that a "minimum" size blank is completely centered above the die because it seats snugly against the seat 48 and against the bottom of tapered side wall 49. As indicated in Figs. 6, 7 and 9, a "large" blank is not completely centered above the die when it is deposited by the feeding mechanism. However, the initial engagement of the extrusion punch with the large blank acts to wedge the high corners of the blank down the tapered side wall 49 against seat 48. This action slightly compresses all four corners of the "large" blank, completely centering the blank and insuring that the extruded product will be symmetrical.

Furthermore, it will be noted the tapered side wall 49 exerts a centering action on any size blank if the blank be not fed exactly into register with the die; it is only necessary that the blank be fed to a position with all four corners above the enlarged upper end of the centering nest to insure centering. Thus, less accurate feeding action is required.

The feeding apparatus will now be described more in detail.

The blanks are fed from a standard feed hopper (not shown) which feeds them to the upper end of a gravity chute 72 (see Figs. 1 and 4). The gravity chute 72 has an upright portion curving into a horizontal portion which is secured to the horizontal curved guide 73. The curved guide 73 in turn is attached to an angle 80 (see Fig. 5) on the base block 34. The gravity chute 72 has recessed cover strips 71 which match recessed cover strips 84 on the horizontal curve guide 73. The feed slot 44 at the die has a wear plate 82 (Fig. 2); feed slot 44 has recessed cover members 81 which extend the closed pathway of the curved guide 73.

It will be understood that these cover strips provide a space or pathway for the square disc blanks 40 which closely fits the blanks at the top face of the blank, at the bottom face and at the side edges. In this way the blank is prevented from tipping or skewing with respect to the line of feed and is constrained to move with its leading edge always at right angles to the line of movement of the blank. It will be noted that the pathway through the curved guide 73 is wider than at the straightway, to allow limited turning of the blanks.

The feeding mechanism at the die will now be described. It comprises spacer plates 74 which provide an extension of the feed pathway 44. The spacer plates 74 have recesses for the lug 76 which is mounted on projection 77 forming part of the selector cross slide 43. The lug 76 and the projection 77 form angular blank-receiving recesses 62 on either side of the lug 76. Cover plates 78 and 79 cover portions of the selector slide 43 and the feed pathway for the blanks. End plates 78' secured to yoke 42 also act to hold down the selector slide 43. The selector slide is driven by a rod 94 slidably passing through the frame 33; rod 94 is driven by apparatus described below.

Figure 2:
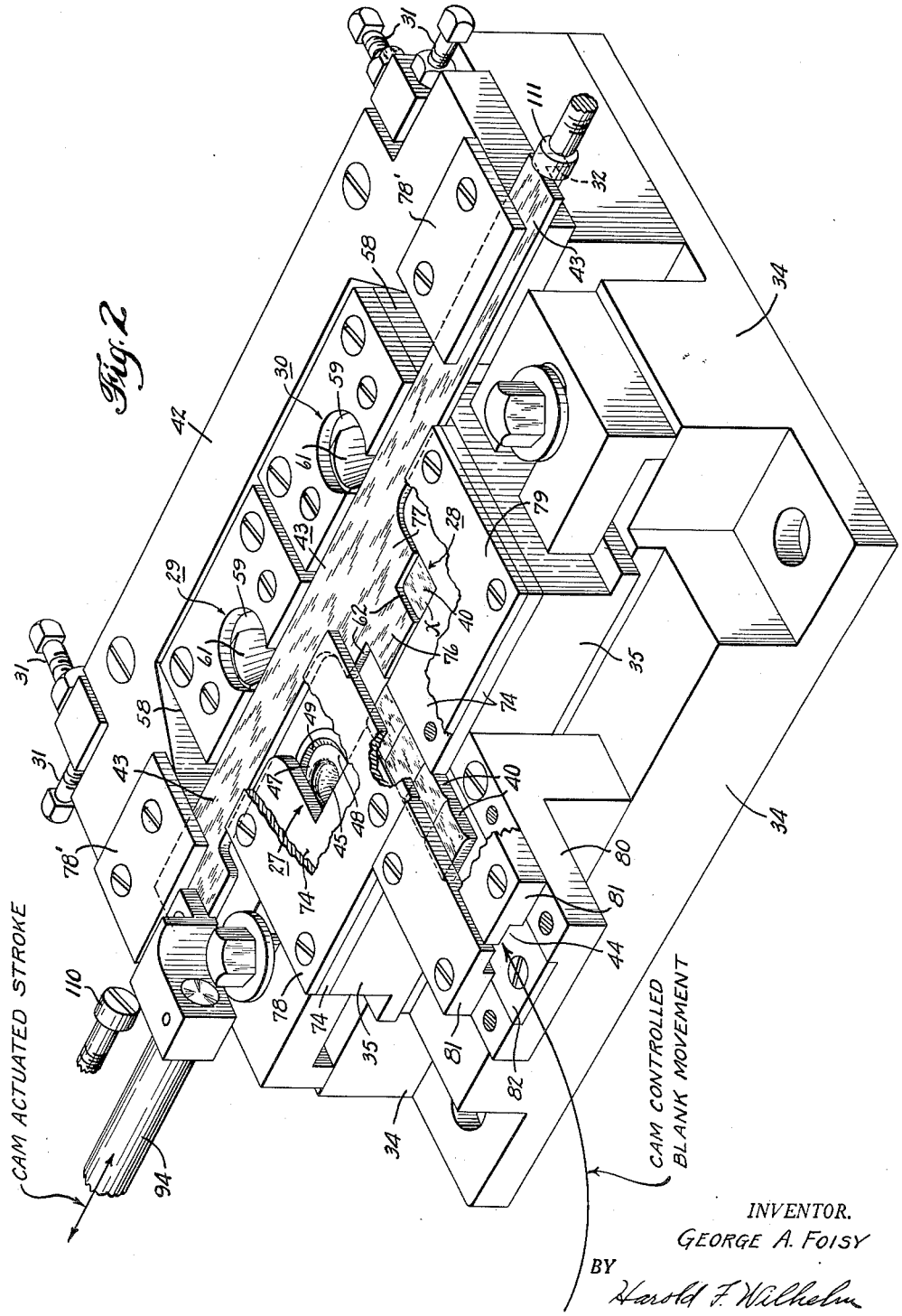
Fig. 2 is a perspective view of the die block assembly, showing a blank in position over the right hand extrusion die, just previous to the cupping and extrusion stroke of the press for this die.

Adjustment devices are provided to adjust the guideway for the selector slide 43. It will be noted that slide 43 has a depending flange 32 (Fig. 2). This flange slides in a vertical groove in yoke 42. Yoke 42 is adjustable with respect to base block 34 by set screw assemblies denoted by 31. In this way the selector slide 43 may be adjusted laterally to insure registry of the blank-receiving recesses 62 with the extrusion dies. The hold-down screws for the yoke 42 have clearance with the holes through which they pass, to permit such slight lateral adjustment.

It will be understood that, as the selector slide 43 reciprocates back and forth from left to right, the blank-receiving recess 62 on either side of the lug 76 is alternately brought into register with the feed pathway 44; thus the lug 76 alternately carries a blank into register with the right hand or left hand extrusion die. A blank, indicated by position X, is shown located over right hand extrusion die 28 in Fig. 2. The other blank-receiving recess 62 is shown ready to receive a blank in Fig. 2. Upon the next movement to the left in Fig. 2, the selector slide 43 will carry a blank to the left hand die 27.

The perpendicular relationship between the lower end of the gravity chute 72 and the end of the curved horizontal guide 73 provides a location for the feed pusher 85 (see particularly Figs. 1 and 10). Pusher 85 positively feeds the blanks 40, one by one, alternately into the blank-receiving recesses 62 of the selector cross slide 43.

The feed pusher 85 slides in a support 83 having cover members 70 forming a guideway for the pusher. Slide 85 is pivotally connected to a connecting rod 93 which is pivoted to a rock lever 86; this in turn is pivoted to the frame at 87. A cam 88 on shaft 89 engages follower 90 on the rock lever 86. A tension spring 91 holds follower 90 in engagement with cam 88.

It will thus be seen that, as shaft 89 rotates, the cam will oscillate the feed pusher 85 back and forth. As pusher 85 is retracted, a blank will move by gravity from the gravity chute 72 into position Y, indicated in Fig. 1. As the feed pusher 85 moves forward, it engages the blank and moves the entire line of blanks in front of the pusher an amount equal to the length of one blank so as to feed a blank into the selector slide 43. It will be noted that the forward movement of the line of blanks is under the action of tension spring 91. This constitutes a safety provision, reducing damage to the machine in case a blank jams.

It will be noted that the forward end of feed pusher 85 has a beveled surface 92 (Fig. 1). This surface engages the corner of the succeeding blank to ease any shock which might be caused by the succeeding blank tending to follow the one being advanced, and the side edge of the feed pusher holds the succeeding blank in position until the feed pusher is withdrawn, in which case the beveled edge 92 eases the fall of the succeeding blank so that it can drop into position Y (Fig. 1) in readiness to be engaged by the nose of the feed pusher on its next forward stroke.

The selector cross slide 43 is driven by a safety device arranged for the purpose of minimizing damage in case a blank jams. Referring to Figs. 11, 12 and 13, the drive rod 94, which drives the cross slide 43, has a connecting rod 105 which carries a lug 104. Lug 104 rests in a notch 103 formed in the end of a finger 100 secured to the end of rock lever 96. Lever 96 is pivoted to the frame at 97 and carries a follower 98. The follower rides in a groove on a drum cam 99 located on shaft 101. Tension spring 106 yieldably holds the lug 104 in notch 103.

Located on connecting rod 105 is an electric microswitch 107 having a contact button 108 adapted to engage a bracket 109 mounted on finger 100. Stops, in the form of set screws 110 and 111, are located in the frame 33 in position to be engaged by the selector slide 43. These adjustable stops positively limit the throw of the selector slide 43 in either direction.

The safety apparatus operates as follows. It will be understood that the adjustment of the throw of selector slide 43 by set screws 110 and 111 causes the lug 104 to ride slightly out of the notch 103 at the end of each stroke during normal operation. But such slight movement is not sufficient to engage switch button 108 with bracket 109. In the event something jams and the selector slide 43 is prevented from taking its normal movement, lug 104 rides entirely out of slot 103 to a position somewhat as indicated in Fig. 13. This engages the pushbutton of switch 108 with the bracket 109, which operates the microswitch 107. This causes the operation of a solenoid (not shown) which releases the clutch of the press from engagement with the fly wheel, stopping the ram, which carries the punches, from further working strokes. This reduces damage to the tools to a reasonable minimum when the cause is feeding trouble.

It will be understood that the drive of the selector cross slide 43 with respect to that of the feed pusher, and with respect to the operation of the machine as a whole, must be correct. The timing of the selector cross slide 43 and of the feed pusher 85 is handled in the following way.

The cam shaft 101 (Fig. 1) has a sprocket 112 driven from the main shaft (not shown) of the press which operates in timed relation to the ram. Cam shaft 101 carries a bevel gear 113 driving the bevel gear 114 on shaft 89 in a one-to-two timing relationship. That is to say, shaft 89 rotates at twice the speed of shaft 101. This operates the feed pusher 85 twice as fast as the selector cross slide 43.

The timing will now be described with particular reference to Figs. 1 and 14.

At the position of the parts of the press shown in the drawings, the right hand extrusion punch is about ready to descend into the extrusion die to cup and extrude the blank (Fig. 5). The right hand trim punch is about to enter the trimming apparatus to remove a scrap ring. The left hand extrusion punch is in idle position in front of the die and the left hand trimming punch is about to enter the extrusion die to trim off the scrap ring from the extruded tubular product.

The right hand cross head has moved almost all the way back. The left hand cross head has moved almost all the way forward. The selector slide 43 has just completed a movement to put a blank over the right hand die (Fig. 1), and the feed pusher 85 is ready to begin to push a new blank into the blank-receiving recess alongside lug 76 of the selector slide 43.

As the right hand extrusion punch completes its extrusion stroke, and the right hand trimming punch completes its entry into the stripping apparatus, and as the left hand trimming punch completes its entry into the extrusion die to trim off the scrap ring, the feed pusher 85 completes its forward stroke to push a blank into position alongside of lug 76.

The ram now moves upward carrying the punches with it; the right hand extrusion punch rises from the extrusion die; the right hand trimming punch is engaged by the stripping apparatus to remove its scrap ring, and the left hand trimming punch removes the severed scrap ring from the extrusion die.

The selector cross slide 43 then moves to the left in Fig. 1 to carry a blank to the left hand extrusion die, and the feed pusher 85 retracts to let another blank down into position Y in Fig. 1.

When all of the plungers are out of the dies, the right hand cross head moves forward and the left hand cross head moves backward, and the machine is ready for an extruding operation by the left hand extrusion punch, and the cycle of events continues.

Thus a machine is provided which feeds blanks positively and automatically without interruption. The centering nest centers the square blanks in proper position for symmetrical extrusion, even though the blanks may vary somewhat in size due to tolerance variations and due to upright or inverted presentations. The centering nest also makes possible less accurate feeding of the blanks. Safety devices are provided for stopping the machine in case something jams. The feed is particularly adapted to a duplex extrusion press where the blanks are fed alternately to the two extrusion positions, whereby a single extrusion operation takes place with each downward stroke of the ram. At the same time, the operations of trimming and stripping are carried out with a minimum of apparatus.

While certain novel features of the invention have been disclosed herein, and are pointed out in the annexed claims, it will be understood that various omissions, substitutions and changes may be made by those skilled in the art without departing from the spirit of the invention.

What is claimed is:

1. In feeding apparatus for a press, spaced extrusion dies, a first pathway connecting said dies, a second pathway extending transversely to said first pathway and intersecting it, means for feeding a line of blanks, one by one, along said second pathway to the intersection with said first pathway, and means for delivering a blank along said first pathway from said intersection, alternately, to said two dies.

2. In feeding apparatus for a press, right hand and left hand dies, a pathway connecting said dies, a second pathway perpendicular to said first pathway and intersecting the midpoint thereof, means for feeding a line of square disc blanks along said second pathway to the intersection with said first pathway, means for delivering a blank along said first pathway from said intersection, alternately, to said two dies, and means restraining said blanks to move edgewise along said pathways with their leading edges substantially perpendicular to the line of travel and with the planes of the blanks perpendicular to the die axes.

3. In feeding apparatus for an extrusion press, a stationary die member having right hand and left hand extrusion dies, a selector cross slide reciprocable in line extending from left to right and located behind said extrusion dies, said selector cross slide having a lug with a blank-receiving recess on either side thereof, a feed guideway connected to said die member and disposed perpendicular to the axis of said selector cross slide and adapted to convey a line of square blank discs lying flat with respect to the extrusion dies, means for reciprocating said selector cross slide, whereby each blank-receiving recess is brought into register with said feed guideway while the other recess is brought into register with an extrusion die, so as to feed said blanks, alternately, to said extrusion dies.

4. In feeding apparatus for an extrusion press, a stationary die member having a die, a first feed guideway connected to said die member and adapted to convey a line of square blank discs lying flat with respect to the die, a blank advancing device comprising a feed guideway intersecting said first feed guideway at right angles thereto, said second feed guideway feeding said blanks into the line of said first feed guideway, a feed pusher having a beveled side edge, a way in which said feed pusher is slidably mounted in line with said first feed guideway whereby, as said blanks are fed from said second feed guideway into said first feed guideway, said pusher pushes the line of blanks toward said die, said beveled edge engaging the corner of a succeeding blank as said pusher pushes a preceding blank.

5. In feeding apparatus for an extrusion press, a stationary die member having right hand and left hand dies, a selector cross slide reciprocable in line extending from left to right and located behind said extrusion dies, said selector cross slide having a lug with a blank-receiving recess on either side thereof, a feed guideway connected to said die member and disposed perpendicular to the axis of said selector cross slide and adapted to convey a line of square blank discs lying flat with respect to the extrusion dies, means for reciprocating said selector cross slide, whereby each blank-receiving recess is in register with said feed guideway while the other recess is in register with an extrusion die, so as to feed said blanks, alternately, to said extrusion dies, a blank advancing device comprising a second feed guideway intersecting said first feed guideway at right angles thereto, said second feed guideway feeding said blanks into the line of said first feed guideway, a feed pusher, a way in which said feed pusher is slidably mounted in line with said first feed guideway whereby, as said blanks are fed from said second feed guideway into said first feed guideway, said pusher pushes the line of blanks so that a blank enters a blank-receiving recess of said selector cross slide.

6. The apparatus according to the preceding claim in which said guideways confine square blank discs so as to cause them to advance with their forward edges perpendicular to the line of travel.

7. In feeding apparatus for an extrusion press, a stationary die member having right hand and left hand dies, a selector cross slide having a member reciprocable in a line connecting said right and left hand dies, stops to limit the movement of said slide, a reciprocating drive element to drive said slide, yieldable devices interposed between said drive element and said slide, normally yieldable to permit said stops to govern the throw of said slide, and means operable by abnormal yield of said yieldable devices to stop the press.

8. In feeding apparatus for an extrusion press, a stationary die member having right hand and left hand dies, a selector cross slide having a member reciprocable in a line connecting said right and left hand dies, stops to limit the movement of said slide, a safety apparatus for driving said slide, said safety apparatus comprising a rock lever, a cam oscillating said lever, a connecting rod connected to said slide, yieldable, disengageable devices carried by said lever and connecting rod, an electric switch operable by said devices whenever they disengage to a predetermined extent, and means for stopping the press upon actuation of said switch.

9. In feeding apparatus for an extrusion press, a stationary die member having right hand and left hand dies, a selector cross slide having a member reciprocable in a line connecting said right and left hand dies, adjustable stops to limit the movement of said slide in both directions, a safety device for driving said slide, said safety device comprising a rock lever, a cam oscillating said lever, said lever having a finger with a notch, a connecting rod connected to said slide and having a lug resting in said notch, a tension spring yieldably holding said lug in said notch, said connecting rod carrying a microswitch having an actuating element, said rock lever carrying an abutment engageable by said actuating element, when said lug rides out of said notch to a predetermined extent, to actuate said switch, and means for stopping the press upon actuation of said switch.

10. In feeding apparatus for a press, an extrusion die having a seat for a disc blank, a plunger adapted to pass through said seat into said die, a feed path whose direction intersects the axis of the die, said path confining said blank to feed it edgewise onto said seat, and a pusher element to push said blank along said path.

11. Apparatus according to the preceding claim in which the feed path has a bottom wall and a cover wall to guide the top and bottom surfaces of the blank, and side walls to guide the side surfaces of the blank, said cover wall extending over said seat and having an opening for passage of said plunger.

GEORGE A. FOISY.

References Cited in the file of this patent
UNITED STATES PATENTS

| Number | Name | Date |
|---|---|---|
| 1,230,811 | Shippee | June 19, 1917 |
| 1,352,194 | Hooker | Sept. 7, 1920 |
| 1,966,510 | Medberg | July 17, 1934 |
| 2,025,108 | Hogg | Dec. 24, 1935 |
| 2,079,905 | Friden | May 11, 1937 |
| 2,363,635 | Blair | Nov. 28, 1944 |
| 2,403,183 | Lefere | July 2, 1946 |
| 2,424,187 | Pearce | July 15, 1947 |
| 2,534,780 | Lovenheim et al. | Dec. 19, 1950 |
| 2,596,962 | Stern | May 13, 1952 |